(12) United States Patent
Ishida et al.

(10) Patent No.: US 7,346,578 B1
(45) Date of Patent: Mar. 18, 2008

(54) ELECTRONIC CASHING CARD SETTLEMENT SYSTEM

(75) Inventors: Yoji Ishida, Fukuoka (JP); Tohru Karashima, Chikushino (JP)

(73) Assignee: Fujitsu Limited, Kawasaki (JP)

(*) Notice: Subject to any disclaimer, the term of this patent is extended or adjusted under 35 U.S.C. 154(b) by 0 days.

(21) Appl. No.: 09/337,737

(22) Filed: Jun. 22, 1999

(30) Foreign Application Priority Data

Jun. 24, 1998 (JP) ............................ 10-195086

(51) Int. Cl.
*G06Q 40/00* (2006.01)

(52) U.S. Cl. ........................... 705/41; 705/39; 705/40; 705/41; 705/42; 705/43; 705/44; 235/379; 235/380

(58) Field of Classification Search ................. 705/46, 705/41, 43, 42, 16, 17, 18, 26, 27, 39, 40, 705/44; 235/379, 380
See application file for complete search history.

(56) References Cited

U.S. PATENT DOCUMENTS

| | | | | |
|---|---|---|---|---|
| 5,577,109 A | * | 11/1996 | Stimson et al. | 379/112 |
| 5,768,382 A | * | 6/1998 | Schneier et al. | 380/23 |
| 5,878,405 A | * | 3/1999 | Grant et al. | 705/39 |
| 5,914,471 A | * | 6/1999 | Van De Pavert | 235/380 |
| 5,944,869 A | * | 8/1999 | Modica et al. | 75/432 |
| 5,952,639 A | * | 9/1999 | Ohki et al. | 235/379 |
| 5,974,145 A | * | 10/1999 | Feiken | 380/24 |
| 6,003,014 A | * | 12/1999 | Lee et al. | 705/13 |
| 6,208,973 B1 | * | 3/2001 | Boyer et al. | 705/2 |
| 6,235,176 B1 | * | 5/2001 | Schoen et al. | 705/4 |
| 6,370,517 B2 | * | 4/2002 | Yanagihara et al. | 705/41 |

FOREIGN PATENT DOCUMENTS

| | | |
|---|---|---|
| DE | 44 41 413 | 11/1995 |
| EP | 0 292 658 | 11/1988 |
| EP | 0 337 794 | 10/1989 |
| EP | 0 775 990 | 5/1997 |
| EP | 0 907 154 | 4/1999 |
| JP | 09-237298 | 9/1997 |
| WO | 90/15382 | 12/1990 |

OTHER PUBLICATIONS

Security, Marketing Keys to Card Success, Retail Delivery Systems News, V1, n7, Apr. 12, 1996.*

(Continued)

*Primary Examiner*—Nga Nguyen
(74) *Attorney, Agent, or Firm*—Staas & Halsey LLP

(57) ABSTRACT

A settlement system is provided for an electronic cashing card such as an IC card, a prepaid card, or the like. A card comprises a memory storing process data to execute a settlement under a condition of matching a personal authentication. Also, a memory stores process data to execute a settlement without matching a personal authentication. When settlement is executed with authentication processing, an authentication balance stored memory is updated to the amount of the balance after the settlement. A non-authentication balance stored in memory is updated to an amount of money equal to or smaller than the authentication balance. When executing a settlement, the non-authentication balance is compared with the authentication balance. It is determined that an illegal process has been executed with the card when the non-authentication balance is larger than the authentication balance.

24 Claims, 12 Drawing Sheets

OTHER PUBLICATIONS

London stock Exchange: ICI profit forecasts trimmed, Financial Times, p. 40, Dec. 21, 1990.*

Technology: The Key to your Identity: Falling costs will allow . . . , Financial Times, Int'l Ed., p. 12, Jul. 15, 1997.*

Pete Hisey, Plunder Down Under, Credit Card Management, p. 116, Nov. 1997.*

How Debit Cards can go Beyond Payment, Bank Network News, pN/A, Oct. 12, 1994.*

Technology: The Keys to your Identity: Falling costs will allow . . . , Financial Times, International Education, p. 12, Jul. 15, 1997.*

Patent Abstract of Japan, Publication No. 09245104; Sep. 19, 1997.

European Search Report dated Aug. 14, 2003 in corresponding European application EP 99 11 1956.

* cited by examiner

FIG. 3A — 12a (also 13a): REGION | MONEY ID (SHOP | MACHINE NO.) | AMOUNT | TIME STAMP | POINT

FIG. 3B — 13c: CLASSIFICATION | MONEY ID (SHOP | MACHINE NO. | SERIAL NO.) | AMOUNT | TIME STAMP | BANK CODE

FIG. 3C — 12b (also 13b): MONEY CLASSIFICATION | MACHINE NO. | SERIAL NO. | REGION | AMOUNT | TIME STAMP | ... | POINT

FIG. 3D — 12c: CLASSIFICATION | NO. OF TIMES OF CONTINUOUS PROCESSES | CONTINUOUS TOTAL AMOUNT | UPPER LIMIT VALUE OF CONTINUOUS PROCESSES | UPPER LIMIT VALUE OF CONTINUOUS TOTAL AMOUNT

| PROCESS | NON-PERSONAL AUTHENTICATION MONEY PROCESSING AREA | | PERSONAL AUTHENTICATION MONEY PROCESS AREA | | |
|---|---|---|---|---|---|
| | DISBURSMENT CONTENT HISTORY AREA | NON-AUTHENTIC-ATION BALANCE | DEPOSIT CONTENT HISTORY AREA | DISBURSEMENT CONTENT HISTORY AREA | AUTHENTICATION BALANCE |
| PROCESS1 | | 10,000 | 10,000 | | 10,000→(10,000) |
| PROCESS2 | 2,000 | 8,000 | 20,000 | | 28,000→(28,000) |
| PROCESS3 | | 28,000 | | | |
| PROCESS4 | 4,000 | 24,000 | | | |
| PROCESS5 | | 9,000 | | 15,000 | 9,000 |
| . . . | . . . | . . . | . . . | . . . | . . . |

FIG. 7A

| PROCESS | NON-PERSONAL AUTHENTICATION MONEY PROCESSING AREA | | PERSONAL AUTHENTICATION MONEY PROCESS AREA | | |
|---|---|---|---|---|---|
| | DISBURSMENT CONTENT HISTORY AREA | NON-AUTHENTIC-ATION BALANCE | DEPOSIT CONTENT HISTORY AREA | DISBURSEMENT CONTENT HISTORY AREA | AUTHENTICATION BALANCE |
| PROCESS | | 5,000 | 10,000 | | 10,000 |
| PROCESS | 1,000 | 4,000 | | | (10,000) |
| PROCESS | | 5,000 | 5,000 | | 9,000 |

FIG. 7B

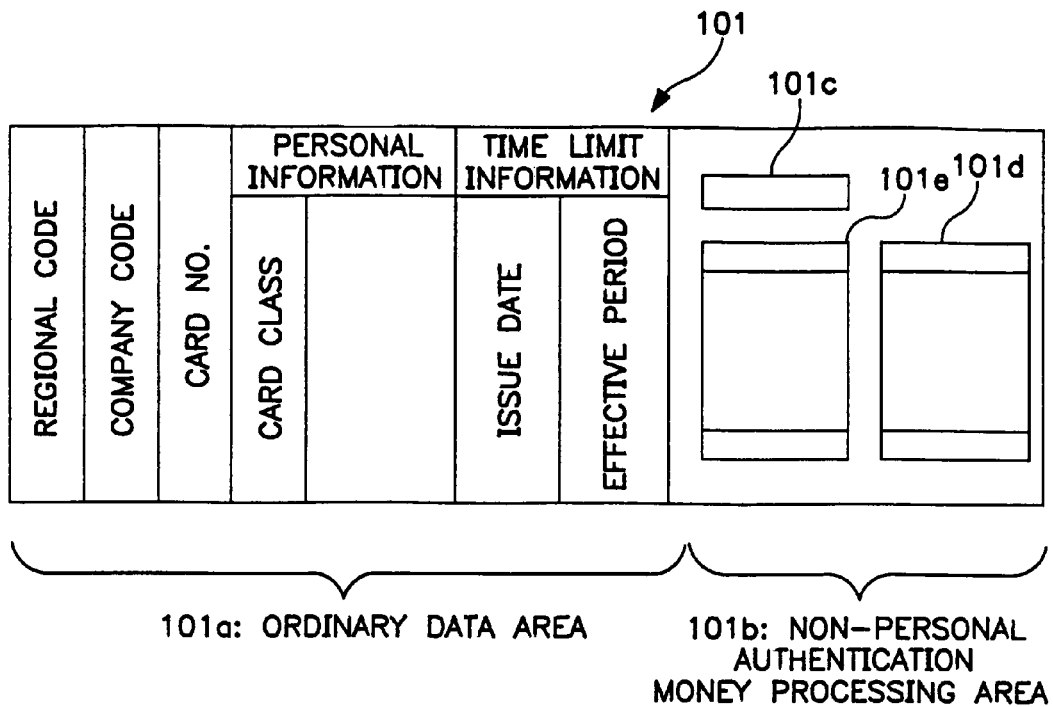
FIG. 10A
(PRIOR ART)
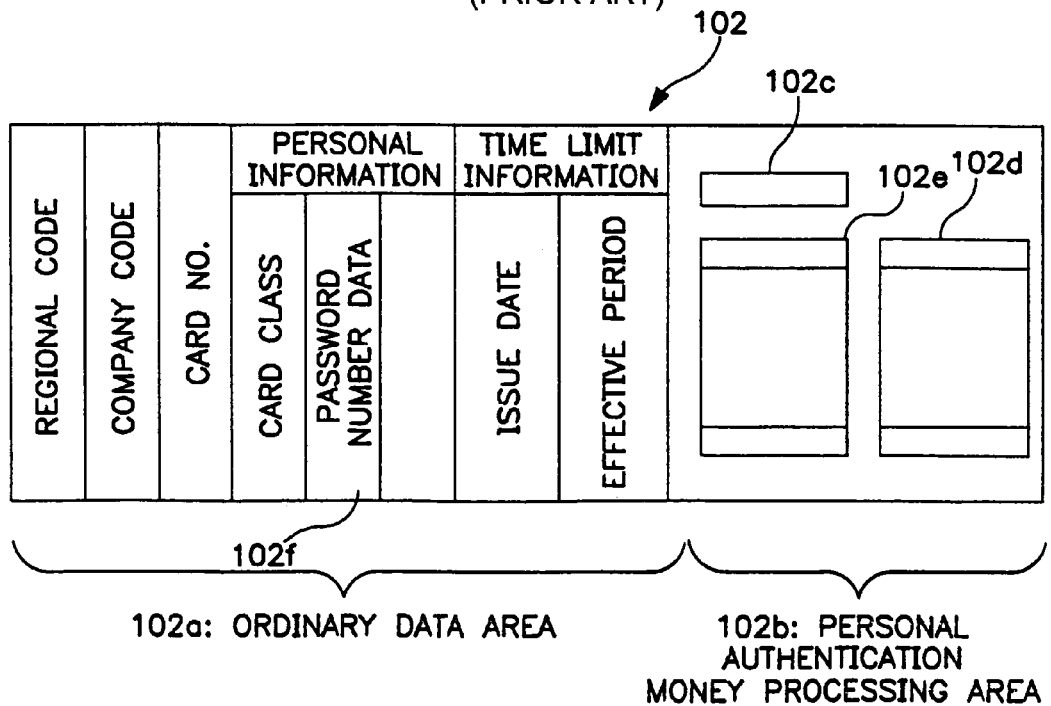
(PRIOR ART) FIG. 10B

ELECTRONIC CASHING CARD SETTLEMENT SYSTEM

CROSS-REFERENCE TO RELATED APPLICATIONS

This application claims the benefit of Japanese Application No. 10-195086, filed Jun. 24, 1998, in the Japanese Patent Office, the disclosure of which is incorporated herein by reference.

BACKGROUND OF THE INVENTION

The present invention relates to an electronic cashing card settlement system for electronic money such as an IC card, a prepaid card or the like. In particular, the present invention relates to an electronic cashing card settlement system in which two kinds of money processing areas are prepared depending on input or non-input of a password number within a card.

A card as illustrated in FIGS. 9-11 has been proposed as an electronic cashing card for transaction settlement. FIG. 9A is a schematic block diagram of an IC card used as an electronic cashing card in the related art, while FIG. 10 is a diagram illustrating a data layout format in the IC card illustrated in FIG. 9A.

In FIGS. 9-11, an electronic cashing card 100 of the related art comprises a non-personal authentication money processing memory 101 for executing settlement of money without request for a password number for personal identification. A personal authentication money processing memory 102 is for storing data for personal authentication money processing to execute settlement of money responding to a request for such a password. Data write/read controlling means 103 is for controlling data writing to or reading from the non-personal authentication and personal authentication money processing memories 101, 102. Controlled arithmetic operation means 104 is for executing settlement of money for non-personal and personal authentication money processing and various kinds of controlled arithmetic operations. Input/output means 107 is for executing data input/output between the controlled arithmetic operation means 104 and a read/write (R/W) unit or ATM (Automatic Teller Machine) of a bank (not illustrated), to which this IC card 100 is inserted.

FIG. 10A illustrates the non-personal authentication money processing memory 101 explained above. Memory 101 comprises a regional code of a management organization, a code of a company issuing the card, and a card number (No.). Also included is an ordinary data area 101a for storing data such as personal information or the like. Further, a non-personal authentication money processing area 101b allows entry of deposit, disbursement, and balance of money as a history in regard to non-personal authentication money processing. Area 101b also allows update of such data.

Meanwhile, the personal authentication money processing memory 102 is illustrated in FIG. 10B. Memory 102 comprises, like the non-personal authentication money processing memory 101, an ordinary data area 102a (corresponding to 101a in FIG. 10A) and a personal authentication money processing area 102b (corresponding to 101b in FIG. 10A) in common. In addition to this structure, memory 102 allows the storing of a password number in the personal information of the ordinary data area 102a.

Next, a settlement operation of an electronic cashing card of the related art, based on the structure explained above, will be explained with reference to FIG. 11. FIG. 11 illustrates a settlement operation flowchart in the non-personal authentication and personal authentication money processing of an electronic cashing card as illustrated in FIG. 9A.

In FIG. 11, a consumer who owns an electronic cashing card shops at a store. An amount of payment for the items selected for purchase is determined as an amount of sales from a terminal equipment (not illustrated) of a Point Of Sales System (POS) (step SP 101). The consumer determines which of the non-personal or personal authentication money processing should be used for this payment, depending on input or non-input of the password number (step SP 102).

When it is determined to execute the settlement without input of the password number, settlement is executed by the non-personal authentication money processing. A non-authentication balance 101c in the non-personal authentication money processing area 101b is read via the write/read control means 103 (step SP 103). This non-authentication balance 101c is compared with the amount of sales (step SP 104). When the non-authentication balance 101c is determined to be larger than or equal to the amount of sales, payment by the non-personal authentication money processing area 101b is executed (step SP 105).

After the settlement by the non-personal authentication money processing is executed, the non-authentication balance 101c is updated (step SP 106). A new amount of money is written as the non-authentication balance 101c (step SP 107).

When the non-authentication balance 101c is determined to be smaller than the amount of sales in step SP 104, a process for disabling settlement of the transaction by the non-personal authentication money processing is executed (step SP 108). This disablement process is executed, for example, by display or announcement of a money shortage amount.

On the other hand, when it is judged that settlement is executed by input of the password in step SP 102, settlement is executed by the personal authentication money processing. In this personal authentication money processing, the password number data in the ordinary data area 102a is read via the write/read control means 103 (step SP 109). Then it is determined whether the password number data matches with the password number input by the consumer (step SP 110).

When a match of the password number data is found at step SP 110, payment by the personal authentication money processing area 102b is executed (step SP 111). After the settlement by the personal authentication money processing is executed, the authentication balance 102c is updated (step SP 112) and a new amount is written as the authentication balance 102c (step SP 113).

When a failure to match the password number data is found at step SP 110, a process for disabling settlement of the transaction by the personal authentication money processing is executed (step SP 114).

Moreover, an example of another electronic cashing card of the related art is illustrated in FIG. 9B, which shows a perspective view of the external appearance of the card. This electronic cashing card 200 of the related art is designed as a type of prepaid card. Card 200 comprises a non-personal authentication money processing memory 201, for writing the amount of money set by the pre-payment in regard to the non-personal authentication money processing. This non-personal processing is for executing settlement of money without request for a password number as personal authentication. Memory 201 also is for writing the balance after the amount of settlement is subtracted from such preset amount.

Moreover, a personal authentication money processing memory 202 is for writing the amount of money set by a pre-payment in regard to the personal authentication money processing. This personal processing is for executing settlement of money with a request for the password number. The balance after the amount of settlement is subtracted from such preset amount.

These non-personal authentication and personal authentication money processing memories 201, 202 are formed in a structure such that a magnetic recording tape is adhered to or buried in the side surface of the card. After the settlement, data writing to the non-personal authentication and personal authentication money processing memories 201, 202 is executed in the same manner as the IC card type electronic cashing card illustrated in FIG. 9A.

Since the electronic cashing card of the related art is structured as explained above, the non-personal authentication money processing and personal-authentication money processing are executed individually and independently of each other. This individual execution applies in both the case of the IC card type and the case of the prepaid card type.

The problem therefore results that a settlement cannot be made when the amount of money has exceeded the amount preset by the non-personal authentication money processing. Namely, an amount of money exceeding the preset limit amount cannot be settled, because the allowable limit amount is generally set from the point of view of transaction security for the non-personal authentication money processing, wherein the password number is not requested. This is the case even when settlement can be executed by cash or deposit to the account of the personal authentication money processing in which the password number is requested.

In this case, it is also considered to conduct a deposit process by shifting money for the personal authentication money processing to money for the non-personal authentication money processing. However, such a deposit process can be executed only with an ATM of a bank or by specially designed R/W equipment. Therefore, the problem arises that settlement at the store location, where shopping is done, is disabled. The range of applications for the card is thereby limited, and the card's convenience of use is extremely limited.

It may happen that the amount of sales exceeds the preset limit amount for the non-personal authentication money processing, but it is possible to make a deposit by shifting money from the personal authentication money processing. In this case a useful purpose is served by previously requesting the password number in the personal authentication money processing. However, the option of such a deposit, even through an authentication process were a password number is requested, has resulted in the problem that transaction security cannot be assured.

SUMMARY OF THE INVENTION

It is therefore an object of the present invention to provide an electronic cashing card which can execute a settlement operation by depositing an amount of money for personal authentication money processing by requesting matching of a personal authentication. Such a card should also maintain transaction security in non-personal authentication money processing wherein matching of the personal authentication is not requested.

The present invention provides an electronic cashing card settlement system for executing settlement with a relevant electronic cashing card. The claimed system comprises, within an electronic cashing card, a non-personal authentication money processing memory for storing data in non-personal authentication money processing for executing settlement of money without a condition for matching of a personal authentication. A personal authentication money processing memory of the card stores data for personal authentication money processing, whereby settlement of money with a condition for matching of a personal authentication can be executed. Thereby, when settlement is executed by the personal authentication money processing, the amount of an authentication balance to be stored in the balance area of the personal authentication money processing memory is updated by the amount of a balance after the settlement. Also, the amount of a non-authentication balance to be stored in the balance area of the non-personal authentication money processing memory is updated to an amount of money less than or equal to the authentication balance or a relevant amount of money. On the occasion of executing the settlement by the non-personal authentication money processing or the personal authentication money processing, the non-authentication balance and the authentication balance are compared. If the non-authentication balance is determined to be larger than the authentication balance as a result of the comparison, it is determined that a certain illegal process has been conducted with the electronic cashing card.

On the occasion of executing the settlement by the personal authentication money processing, whereby the settlement of money is executed under the condition of matching the personal authentication, the amount of money of the authentication balance of the personal authentication money processing memory is updated. Also, an amount of money of the non-authentication balance of the non-personal authentication money processing memory is updated to the amount of money equal to or smaller than the amount of the authentication balance. Moreover, on the occasion of executing the settlement by the non-personal authentication money processing, wherein settlement is executed without the condition of matching a personal authentication, it is determined that an illegal process has been executed with the electronic cashing card if the non-authentication balance is larger than the authentication balance as a result of comparison between these balance amounts.

Therefore, the money of the personal authentication money processing can be used in a disbursement process for the settlement by the non-personal authentication money processing. Moreover, transaction security can also be assured to improve convenience and safety of the card.

Furthermore, the present invention is characterized in that, when settlement is executed by the non-personal authentication money processing, a balance after the settlement is calculated on the basis of the non-authentication balance to be stored in the balance area of the non-personal authentication money processing memory. The non-authentication balance, in the non-personal authentication money processing memory, is updated to the balance after the settlement. When settlement is executed by the personal authentication money processing, the balance after settlement is calculated on the basis of the non-authentication balance stored in the balance area of the non-personal authentication money processing memory. The non-authentication balance of the non-personal authentication money processing memory and authentication balance of the personal authentication money processing memory are updated to the balance after settlement.

Accordingly, when settlement is executed by the non-personal authentication money processing, it is no longer required to make access to the personal authentication money processing area. Therefore, security of the transaction can be assured. In the non-personal authentication money processing, a subtraction is conducted only by disbursing the non-authentication balance. Therefore, the non-authentication balance does not exceed the authentication balance in a regular transaction. If such a non-authentication balance exceeds the authentication balance, it is determined that a certain illegal process has been executed for the electronic cashing card.

In addition, when settlement is executed by the non-personal authentication processing of the invention, the authentication balance and the non-authentication balance are stored respectively in the personal authentication money processing area and non-personal authentication money processing area. Because these balances are distinct from each other, the balance after settlement is calculated on the basis of the non-authentication balance reflecting the result of settlement by the non-personal authentication money processing. When making settlement by the personal authentication money processing, synchronization can be taken by setting both the authentication balance and the non-authentication balance to the balance after the settlement.

Moreover, when settlement is executed by the non-personal authentication money processing, the balance after the settlement is calculated on the basis of the non-authentication balance stored in the balance area of the non-personal authentication money processing memory. The non-authentication balance of the non-personal authentication money processing memory is updated to the balance after the settlement. When settlement is executed by the personal authentication money processing, the balance after the settlement is calculated on the basis of the authentication balance stored in the balance area of the personal authentication money processing memory and the non-personal authentication balance stored in the balance area of the non-personal authentication money processing memory. The authentication balance of the personal authentication money processing memory is updated to the balance after the settlement. Moreover, the non-authentication balance of the non-personal authentication money processing memory is updated to an amount of money smaller than the authentication balance under a predetermined condition.

Even in this structure, when the settlement is executed by the non-personal authentication money processing, settlement can be executed without making access to the personal authentication money processing area. This ensures transaction security, in that the non-authentication balance does not exceed the authentication balance in a regular transaction. Therefore, if the non-authentication balance exceeds the authentication balance, it is determined that a certain illegal process has been performed with the electronic cashing card.

On the other hand, in the synchronization processing between the authentication balance and non-authentication balance in the personal authentication money processing, these balances are never matched and the non-authentication balance is set to an amount of money smaller than the authentication balance under a predetermined condition. Thereby, the amount of money available for a settlement by the non-personal authentication money processing is limited to assure greater transaction security.

When required, the settlement system of the present invention compares the non-authentication balance and the authentication balance for every predetermined number of transactions by the non-personal authentication money processing.

When required, the settlement system of the present invention sets a limit amount for settlements to be executed by the non-personal authentication money processing. The system determines that a certain illegal process has been executed with the electronic cashing card when the amount of a disbursement to be written as the disbursement history of the non-personal authentication money processing memory becomes larger than the settlement limit amount.

When required, when a deposit or settlement process is executed by the personal authentication money processing, the settlement system of the present invention deposits a predetermined amount or a predetermined rate to the non-personal authentication money processing in order to write such amount or rate to the predetermined area of the non-personal authentication money processing memory.

When required, the settlement system of the present invention is provided, in the electronic cashing card, with an arithmetic means for executing various arithmetic calculations in regard to the non-personal authentication money processing and the personal authentication money processing. The arithmetic means also controls the read and write operations to the non-personal authentication and personal authentication money processing memories. Also provided is an input/output means for executing input and output of data between the relevant arithmetic means and an external device.

The invention further provides a transaction settlement system comprising a transaction terminal and an electronic transaction card readable by the terminal. The card includes memory storing an authentication balance and a non-authentication balance. The authentication balance is for transaction settlement by an authentication process requiring a personal authentication to be matched. The non-authentication balance is for transaction settlement by a non-authentication process wherein the personal authentication is not required to be matched. The system further comprises a control unit controlling updates to the authentication balance and the non-authentication balance. The control unit detects that an illegal process has been performed with the card when a comparison indicates the non-authentication balance is greater than the authentication balance.

BRIEF DESCRIPTION OF THE DRAWINGS

These and other objects and advantages of the invention will become apparent and more readily appreciated from the following description of the preferred embodiments, taken in conjunction with the accompanying drawings of which:

FIG. 3 illustrates a format for each of disbursement data, deposit data, balance data, and protection limitation data of non-personal authentication money processing in the data layout illustrated in FIG. 2;

FIG. 7 illustrates operations in the synchronization process illustrated in FIG. 6;

FIGS. 10A-B are diagrams illustrating the data layout format of the IC card type electronic cashing card illustrated in FIG. 9A.

DESCRIPTION OF THE PREFERRED EMBODIMENTS

Figure 1:
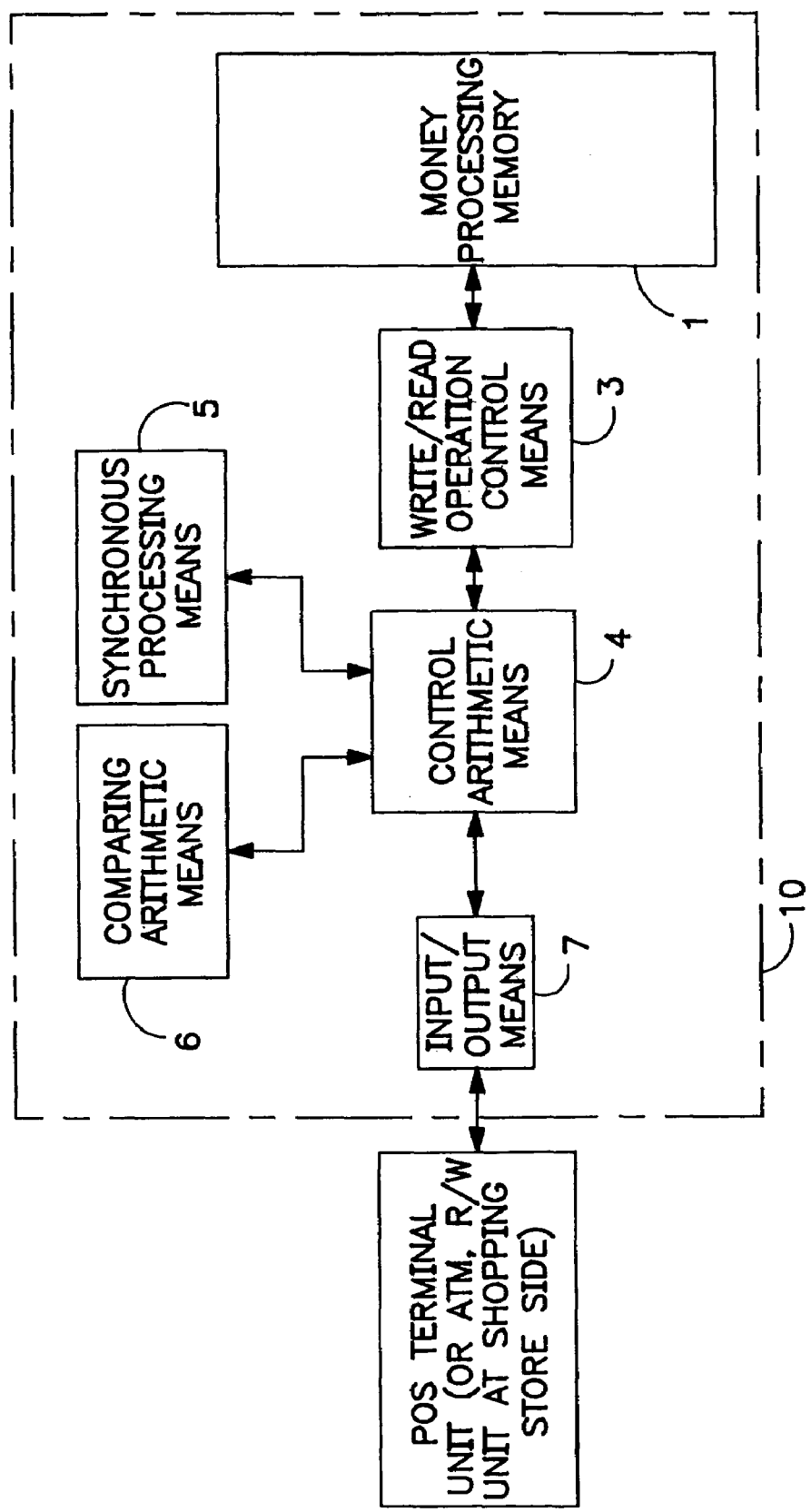
FIG. 1 is a schematic block diagram of a settlement system of an electronic cashing card according to a preferred embodiment of the present invention.

The settlement system of the present invention will now be explained, with reference in detail to presently preferred embodiments thereof. Examples of those preferred embodiments are illustrated in the accompanying drawings, wherein like reference numerals refer to like elements throughout.

Figure 2:
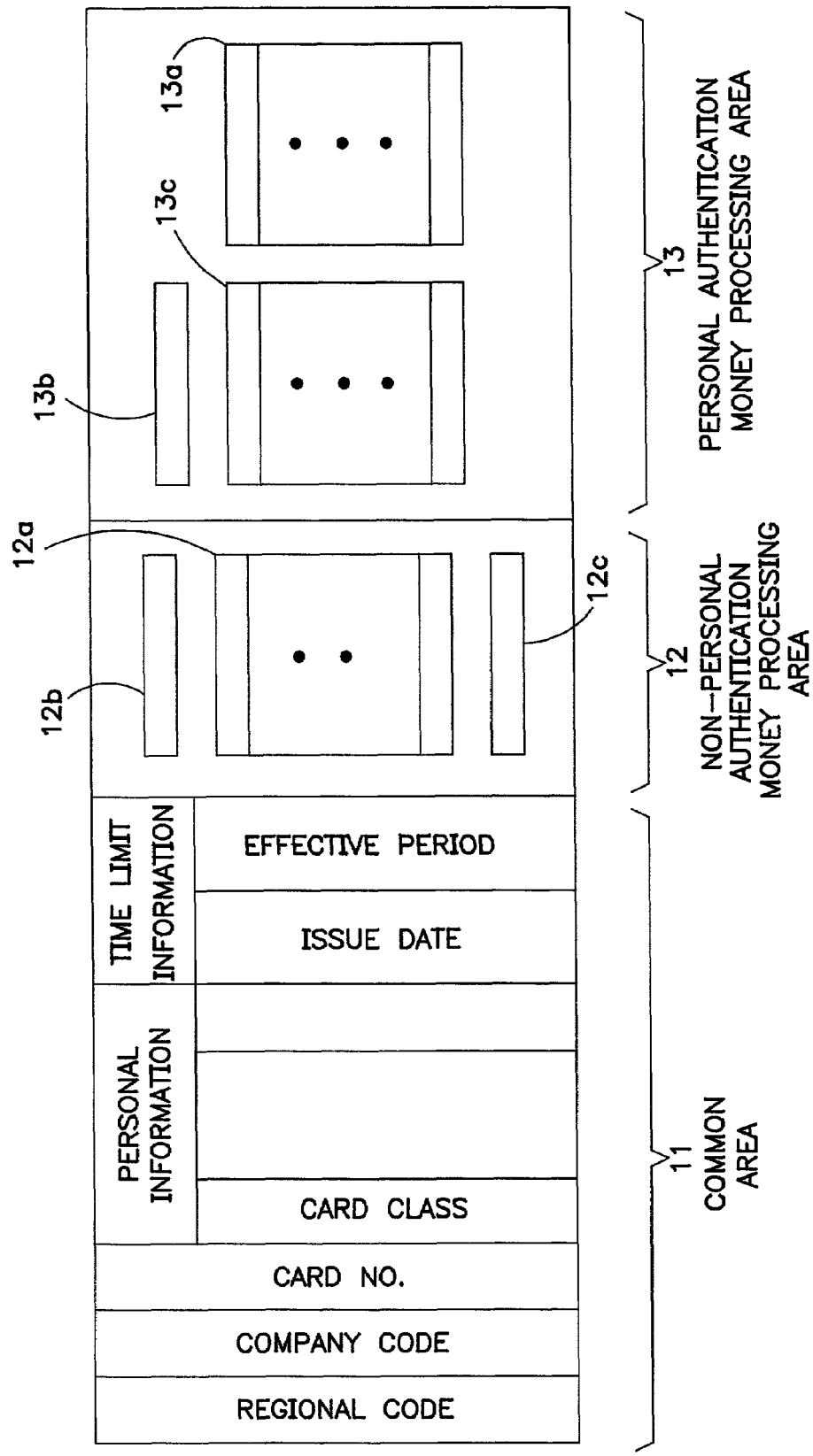
FIG. 2 is a data layout format in the settlement system illustrated in FIG. 1.

The settlement system of a first embodiment of the present invention will be explained with reference to FIGS. 1-4. FIG. 1 is a schematic block diagram of the settlement system of this embodiment. FIG. 2 is a diagram illustrating a data layout format in the settlement system illustrated in FIG. 1. FIG. 3 is a diagram illustrating a format for each of disbursement data, deposit data, balance data, and protection limit data in the non-personal authentication money processing with the data layout illustrated in FIG. 2.

Figure 4:
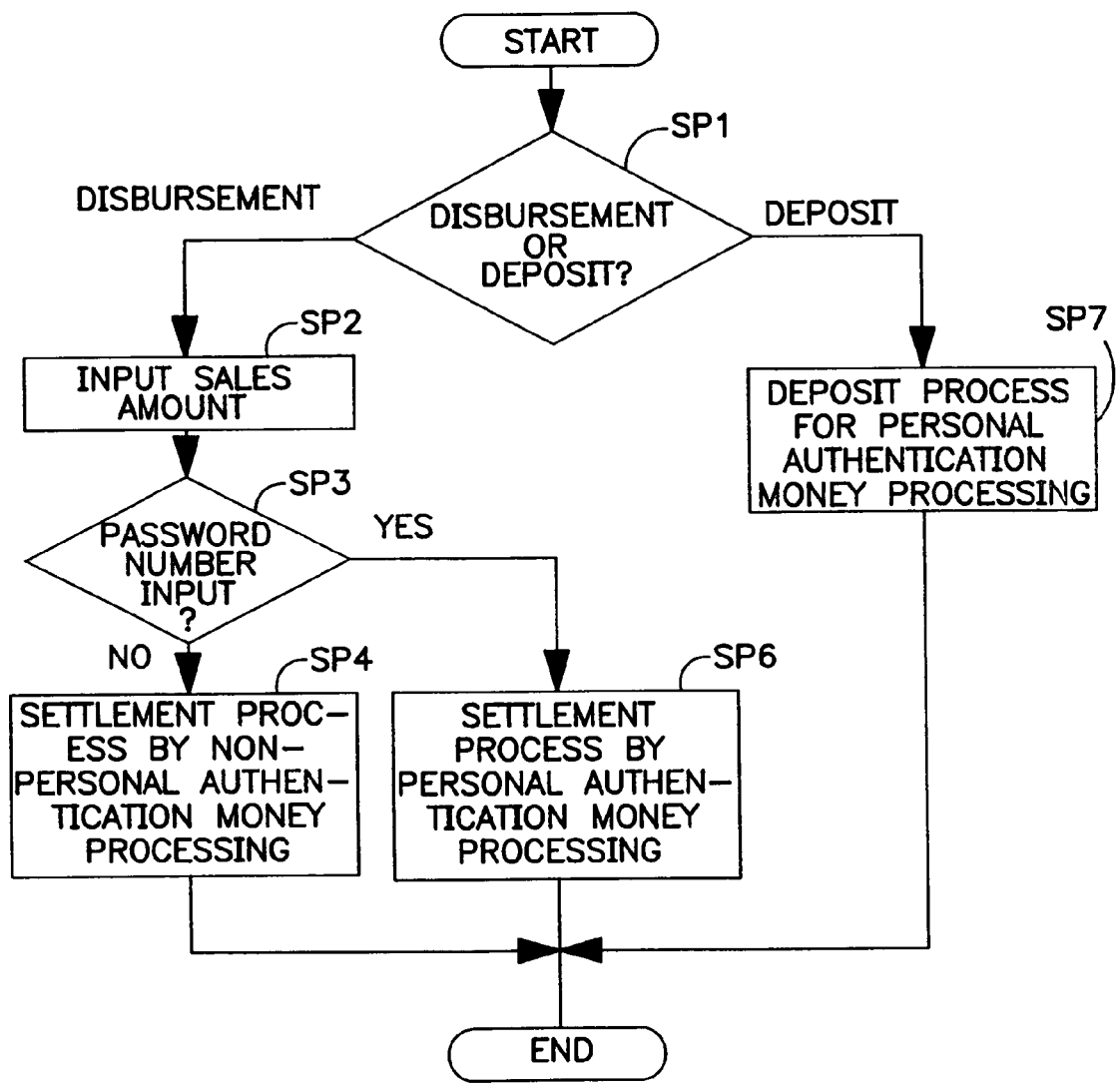
FIG. 4 illustrates a schematic operation flowchart for a total settlement process of the settlement system illustrated in FIG. 1.
Figure 5:
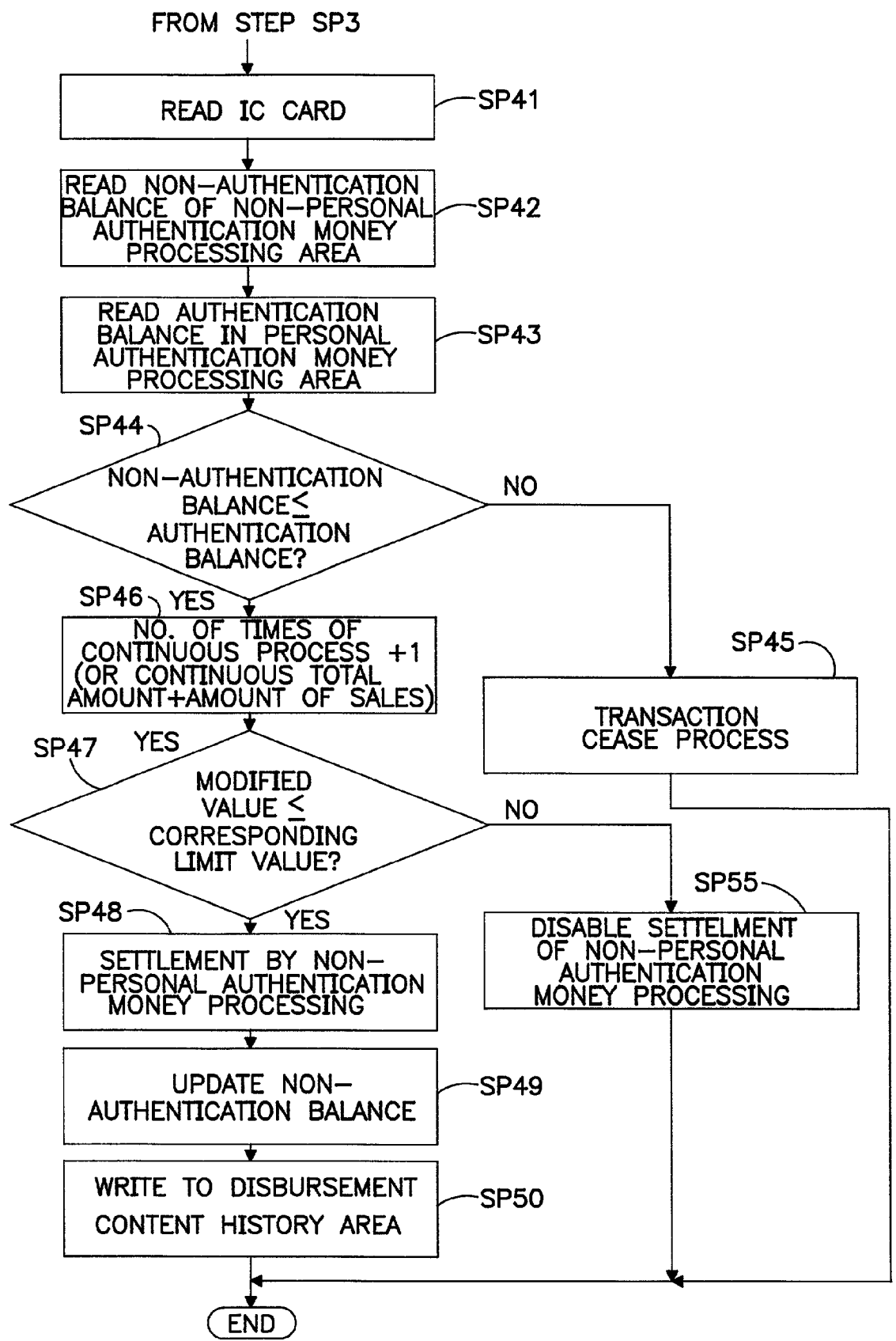
FIG. 5 illustrates a detail operation flowchart of step SP 3 in the total schematic operation flowchart illustrated in FIG. 4.
Figure 6A:
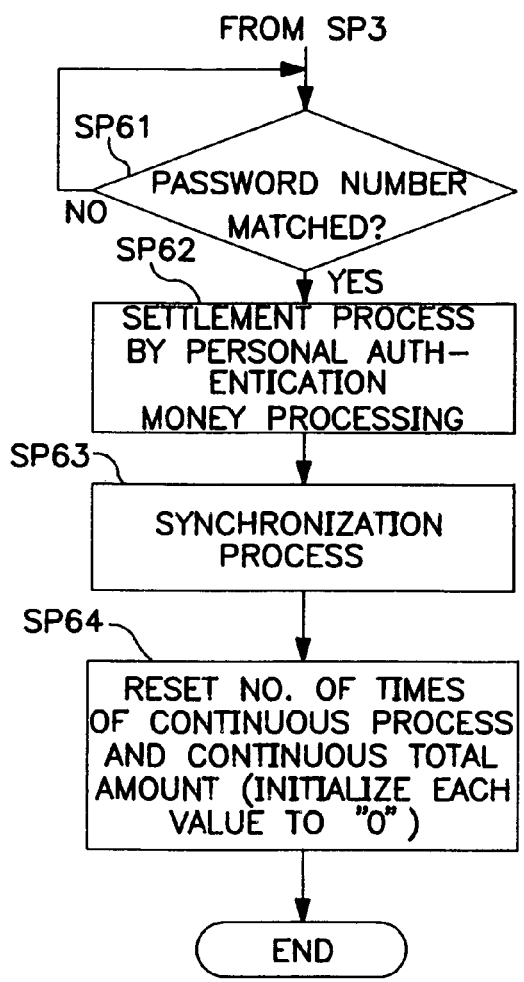
FIG. 6 illustrates a detail operation flowchart of step SP 6 and step SP 7 in the total schematic operation flowchart illustrated in FIG. 4.
Figure 6B:
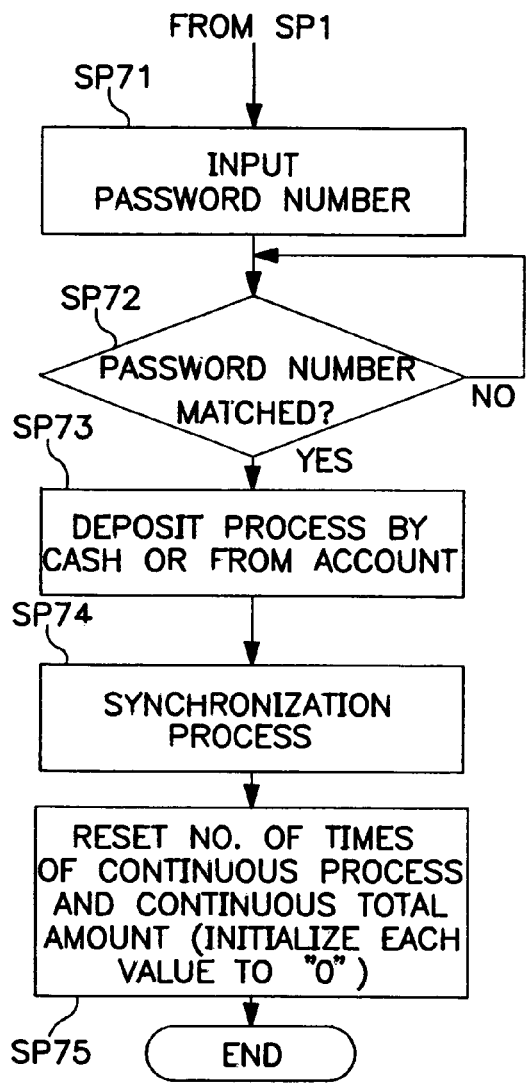

FIGS. 4-6 each illustrate an operation flowchart of the settlement process of the electronic cashing card settlement system illustrated in FIG. 1.

Figure 9A:
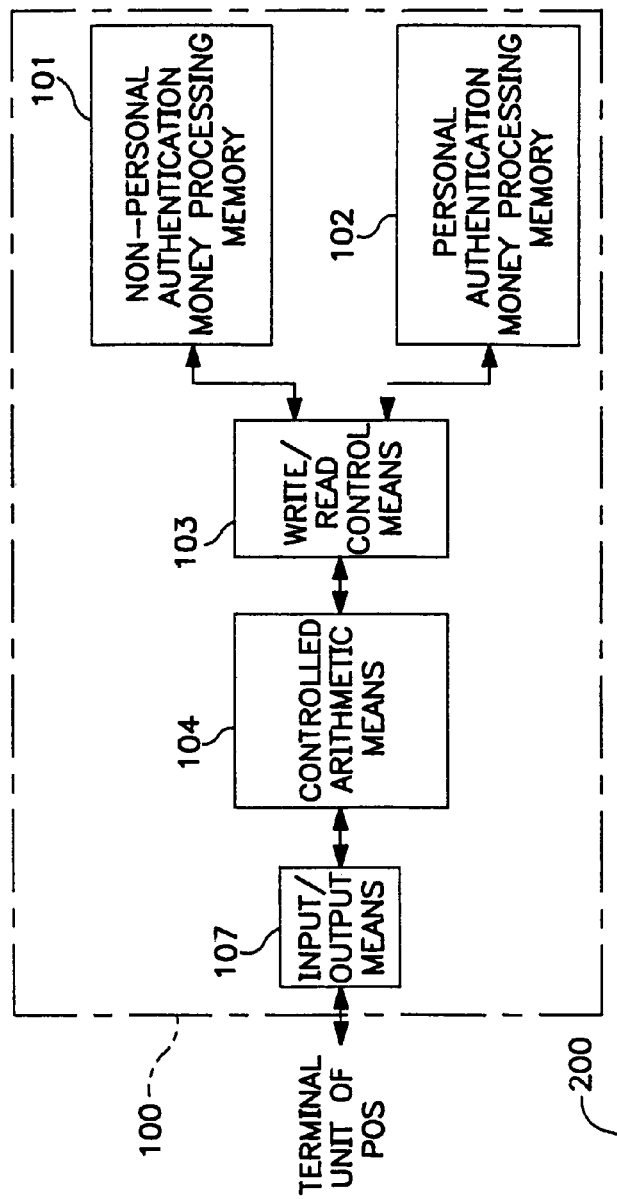
FIG. 9A is a schematic block diagram of an IC card type electronic cashing card for a related system.
Figure 9B:
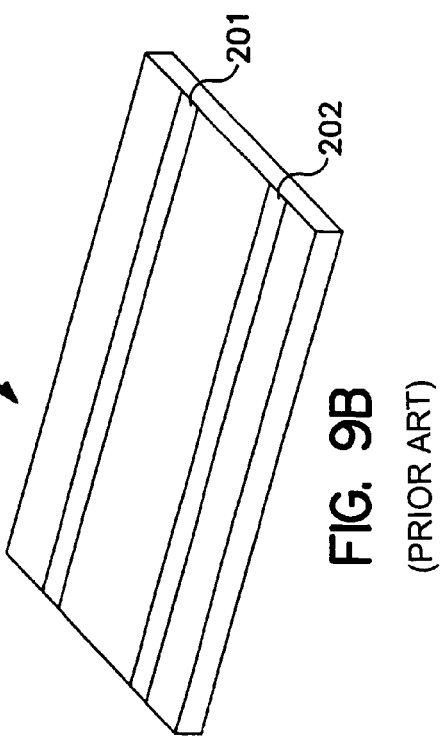
FIG. 9B is a perspective view of the external appearance of an electronic cashing card of the related art.
Figure 11:
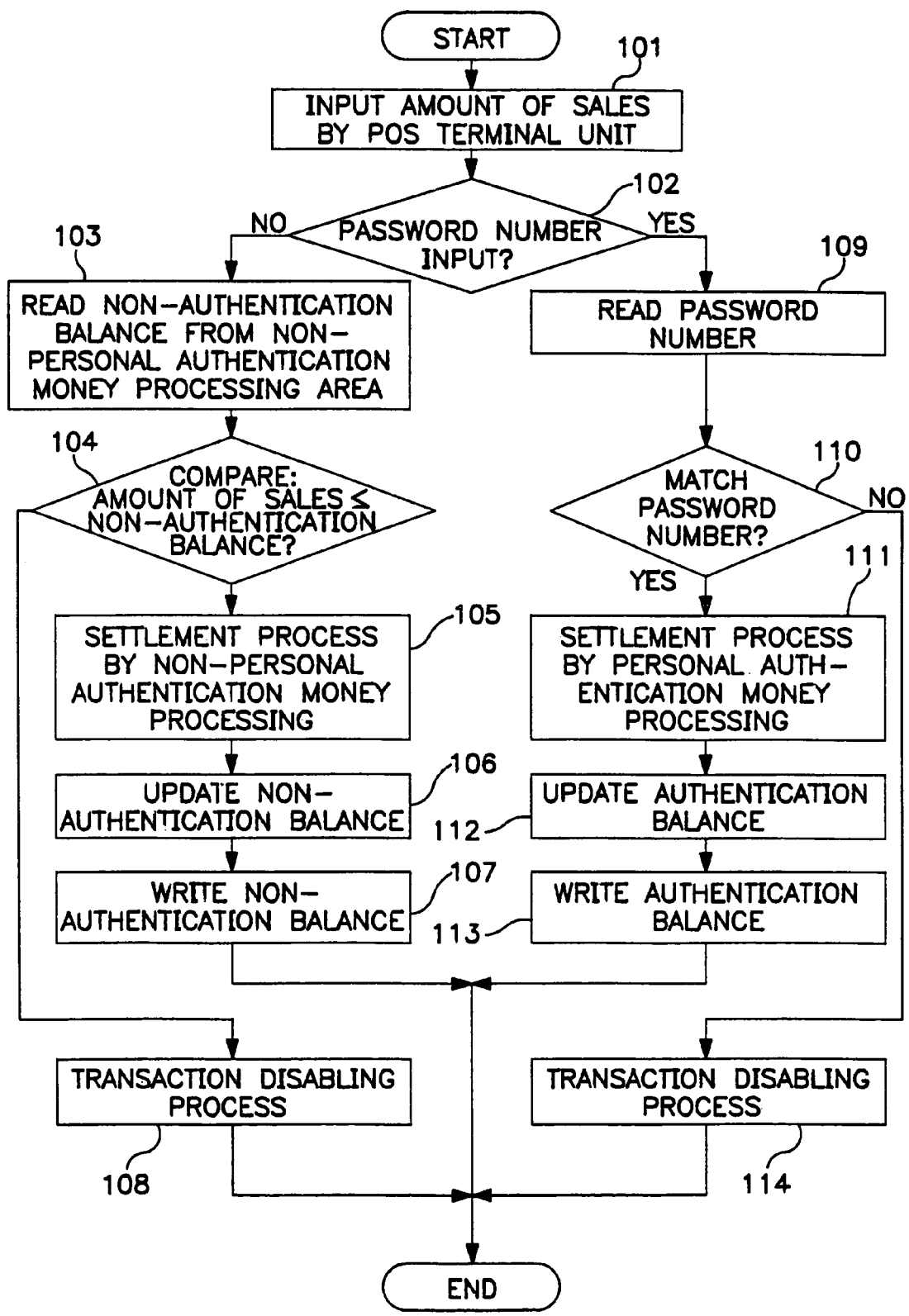
FIG. 11 illustrates a settlement operation flowchart in the non-personal authentication and personal authentication money processing of the electronic cashing card of the related system illustrated in FIG. 9A.

Like the electronic cashing card in the system of the related art illustrated in FIG. 9, the electronic cashing card settlement system of this embodiment, as illustrated in each figure, comprises a write/read control means 3, a control arithmetic means 4, and an input/output means 7. Also included in this embodiment is a money processing memory 1 for each data of the non-personal authentication money processing (for executing settlement of money without request for a password number as a personal authentication), the personal authentication money processing (for executing settlement of money with a request for a password number as a personal authentication) and the management items in common for these money processes, as explained above.

Moreover, a synchronous processing means 5 executes synchronization processing under a predetermined condition for each balance of the non-personal authentication money processing and the personal authentication money processing, the balances being stored in the money processing memory 1. This synchronization processing is executed under the control of the control arithmetic means 4. A comparing arithmetic means 6 compares balances of the non-personal authentication money processing and the personal authentication money processing stored in the money processing memory 1, under the control of the control arithmetic means 4. Therefore, as a result of the arithmetic comparison by the comparing arithmetic means 6, it is determined that a certain illegal process has been conducted with the IC card 10 when the balance of the non-personal authentication money processing is determined to be larger.

As shown in FIG. 2, the money processing memory 1 is structured to comprise a common area 11 for storing the data common to the non-personal authentication money processing and personal authentication money processing in regard to the IC card 10. A non-personal authentication money processing area 12 stores data of non-personal authentication money processing, and a personal authentication money processing area 13 stores data of personal authentication money processing.

The common area 11 includes a regional code of a management organization, a company code of a company as a card issuing organization, a card number, and data of personal information. The personal information includes a password number and time limiting information. The non-personal authentication money processing area 12 includes a disbursement content history area 12a that stores as history data a disbursement content, obtained by execution of the settlement process, of the amount of sales by the non-personal authentication money processing. The history data is stored in the data format illustrated in FIG. 3A. A balance area 12b stores a non-authentication balance used by the non-personal authentication money process after execution of the settlement process for the amount of sales. The non-authentication balance is stored in the data format illustrated in FIG. 3C. A limitation information area 12c stores various pieces of limitation information for executing non-personal authentication money processing. The limitation information is stored in the data format illustrated in FIG. 3D.

This limitation information area 12c stores various data, such as the number of times of continuous processes as accumulated data, i.e., a count of the number of continuous executions of the settlement process by the non-personal authentication money processing. Also stored is a continuous total amount obtained by totaling the amounts of sale settled by such continuous processes. A continuous process upper limit value limits the allowed continuous processes, and a continuous amount upper limit value limits the continuous total amount for the continuous processes. The number of times of continuous processes and the continuous total amount are sequentially added for each execution of a continuous settlement process by the non-personal authentication money processing. When a settlement process or a deposit process is executed by the personal authentication money processing, such values are reset to "0" respectively.

The personal authentication money processing area 13 includes a disbursement content history area 13a for storing as history data as disbursement content, obtained by executing the settlement process, for an amount of sales by the personal authentication money processing. The history (i.e., disbursement) data is stored in the data format illustrated in FIG. 3A. A balance area 13b stores an authentication balance amount to be used by the personal authentication money processing after the settlement process for amount of sales is executed. The authentication balance amount is stored in the data format illustrated in FIG. 3C. A deposit content history area 13c stores the deposit content for the personal authentication money processing in the data format illustrated in FIG. 3B.

Next, operation of the settlement process executed by the electronic cashing card settlement system of the present embodiment, based on the structure explained above, will be explained with reference to FIG. 4.

In FIG. 4, it is determined first whether the process by a consumer (as the owner of the IC card 10) should execute a disbursement operation or a deposit operation using the IC card 10 (step SP 1). When the disbursement process is determined to be executed in step SP 1, an amount of sales is input (step SP 2). Moreover, whether a password number is input or not is determined (step SP 3). If the password number is determined to be not input in step SP 3, a series of processes for the settlement process are executed by the non-personal authentication money processing (step SP 4). When the password number is determined to be input in step SP 3, a series of processes for a settlement process are executed by the personal authentication money processing (step SP 6).

Moreover, when the deposit operation is determined to be executed in step SP 1, a series for operations for a deposit process are executed by the personal authentication money processing (step SP 7).

The settlement process by the non-personal authentication money processing in step SP 4 of FIG. 4 is illustrated by the flowchart of FIG. 5. In FIG. 5, the common area 11 of the IC card 10 is read (step SP 41). Moreover, the non-authentication balance of the non-personal authentication money processing area 12 is read from the balance area 12b (step SP 42). In addition, the authentication balance of the personal authentication money processing area 13 is read from the balance area 13b (step SP 43). This read non-personal balance is compared with the authentication balance in the comparing arithmetic unit 6 (step SP 44).

When the non-authentication balance is determined to be the larger value in step SP 44, a transaction cease process is executed under the assumption that an illegal process has been performed with the IC card 10 (step SP 45). Meanwhile, in step SP 44, when the authentication balance is determined to be the larger value, or the values are equal, "1" is added to the number of times of continuous processes. Thereby an accumulated value of the number of times of continuous execution of the settlement process by the non-personal authentication money processing is indicated (step SP 46). Moreover, in step SP 46, the amount of sales can also be added to the continuous total amount, which is a total amount of the settlement processes of the number of times of continuous processes in step SP 46.

It is then determined whether the added number of times of continuous processes is a value equal to or smaller than the upper limit value of continuous processes stored in the limitation information area 12c (step SP 47). Whether the continuous total amount, to which the amount of sales is added in step SP 47, is a value equal to or smaller than the continuous total amount stored in the limitation information area 12c can also be determined.

When the continuous total amount is determined to be equal to or smaller than the upper limit of continuous processes in step SP 47, or equal to or smaller than the upper limit value of the continuous total amount, the settlement process by the non-personal authentication money processing is executed (step SP 48). The non-authentication balance calculated by this settlement process updates the non-authentication balance of the balance area 12b (step SP 49) and is written as a new non-authentication balance (step SP 50). Moreover, a disbursement content, based on the settlement process executed in step SP 48, is written to the disbursement content history area 12a (step SP 50).

When the number of times of continuous processes is determined to be equal to or larger than the upper limit of continuous processes in step SP 47, or when the continuous total amount is determined to be equal to or larger than the upper limit value of the continuous amount, a message indicating that settlement by the non-personal authentication money processing is disabled is notified or displayed from a register or a terminal equipment or the like of the POS system (step SP 55). For example, as a notifying and displaying method, settlement by personal authentication money processing or settlement by cash can be selected.

FIG. 6A illustrates the settlement process by the personal authentication processing in step SP 6. First, it is determined whether the password number matches (step SP 61). The settlement process by the personal authentication money processing is executed under the condition that the passwords are matched (step SP 62). On the basis of the authentication balance after this settlement process, the synchronous processing means 5 executes the synchronization process (step SP 63). This synchronization process updates the disbursement content history area 12a of the non-personal authentication money processing area 12, under the condition that the settlement process is executed by the personal authentication money processing. The disbursement content history area 13a of the personal authentication money processing area 13 is also updated. Further, the authentication balance and the non-authentication balance are updated. After this synchronization process is executed, each value is reset to "0" by resetting the accumulated values for the number of times of continuous processes and continuous total amount of money (step SP 64).

In the case of a deposit process by the personal authentication money processing in step SP 7, the password number is input (step SP 71) and then the deposit process is executed by cash or from the account with the condition of matching of the password (step SP 73). Thereafter, the synchronous processing means 5 performs the synchronization process based on the authentication balance after this deposit process (step SP 74). This synchronization process is performed by updating the disbursement content history area 12a of the non-personal authentication money processing area 12. The disbursement content history area 13a of the personal authentication money processing area 13 is also updated as required, and the authentication balance and non-authentication balance are updated. In this case, the updates are executed under the condition that the deposit process has been executed by the personal authentication money processing. After this synchronization process has been executed, the accumulated value of the number of times of continuous processes and the continuous total amount are reset to initialize each value to "0" (step SP 75).

The practical synchronization process will be explained with reference to FIGS. 7A and 7B. First, a practical example will be described with reference to FIG. 7A. When a deposit process for ¥10,000 (process 1) is executed by the personal authentication money processing, ¥10,000 is written to the deposit content history area 13c and the balance area 13b. Also, ¥10,000 is written to the balance area 12b of the non-personal authentication money processing area 12. When a settlement process (process 2) for ¥2,000 is executed by the non-personal authentication money processing in such a deposit condition, only the disbursement content history area 12a and the balance area 12b are updated to ¥8,000.

Next, when a deposit process (process 3) for ¥20,000 is executed by the personal authentication money processing, ¥20,000 is written to the deposit content history area 13c, as in process 1. The authentication balance of the balance area 13b and the authentication balance of the balance area 12b are also updated to ¥28,000.

The balance of the non-personal authentication money processing area 12 reflects the disbursement process of the non-personal authentication money processing by process 2, while the balance of the personal authentication money processing area 13 does not reflect such a disbursement process. Therefore, the balance is calculated on the basis of the balance of the non-personal authentication money processing area 12 and the deposit process amount, and both balances of the balance areas 12*b*, 13*b* are updated. Thereby, the contents of the non-personal authentication money processing area 12 and the personal authentication money processing area 13 can be synchronized.

Moreover, when a settlement process (process 4) for ¥4,000 is performed by the non-personal authentication money processing, ¥4,000 is written to the disbursement content history area 12*a* as in the case of the process 2, and the balance area 12*b* is updated to ¥24,000.

In addition, when a settlement process (process 5) for ¥15,000 is performed by the personal authentication money processing, ¥15,000 is written to the disbursement content history area 13*a*, as in the case of the deposit process of the processes 1 and 3. Balance area 13*b* and balance area 12*b* are updated to ¥9,000. This update is performed according to the balance in the non-personal authentication money processing area 12 and the balance calculated on the basis of the settlement process amount. Thereby, the contents of the non-personal authentication money processing area 12 and personal authentication money process area 13 may be synchronized.

For settlement by the non-personal authentication money processing, only the disbursement content history area 12*a* and the balance 12*b* of the non-personal authentication money processing area 12 are updated. The synchronization process is executed in this case for each deposit or transaction settlement by the personal authentication money processing. Accordingly, in a regular application of the IC card 10, the non-authentication balance of the non-personal authentication money processing area 12 does not exceed the authentication balance of the personal authentication money processing area 13. Therefore, an illegal process with the IC card 10 can be determined by comparing the amounts of the non-authentication balance and the authentication balance of the balance areas 12*b*, 13*b* through execution of the synchronization process.

In FIG. 7B, the non-authentication balance of the non-personal authentication money processing area 12 is limited to ¥5,000 or less. In this case, when a deposit process of ¥10,000 is performed by the personal authentication money processing, the deposit amount to the balance area 12*b* of the non-personal authentication money processing area 12 (written as an additional amount) is limited to ¥5,000. Limitation to this predetermined amount may be made with a predetermined rate and the desired amount of money of ¥10,000 for the deposit process, in addition to the amount of ¥5,000. The other operations will be executed as in the FIG. 7A case.

Figure 8:
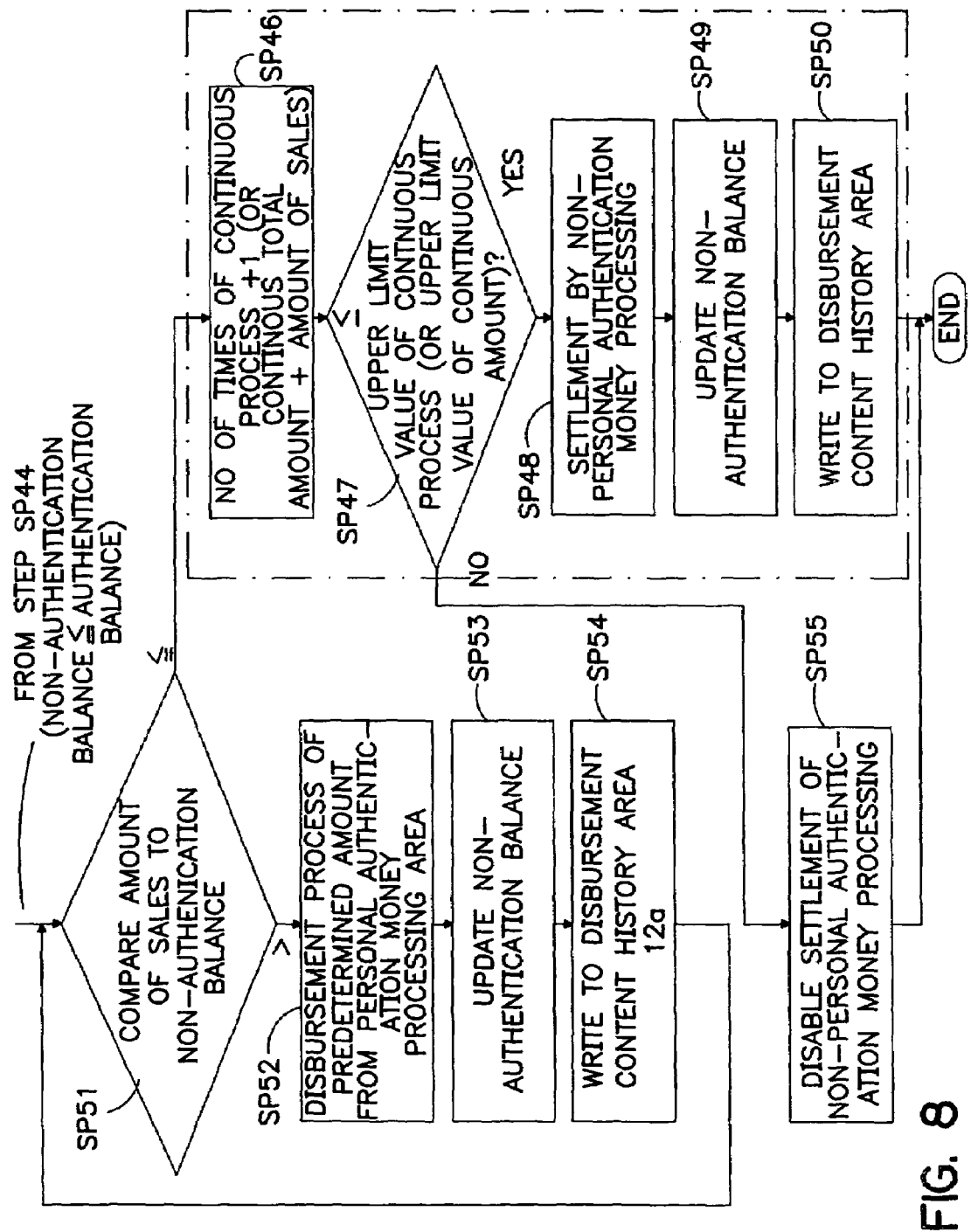
FIG. 8 illustrates an operation flowchart of a deposit process to the non-personal authentication money processing area in a settlement system according to a second embodiment of the present invention.

FIG. 8 illustrates an operation flowchart of a deposit process for non-personal authentication money processing in a system according to a second embodiment of the present invention.

In FIG. 8, the electronic cashing card settlement system of this embodiment is provided with a structure to detect execution of an illegal process with respect to the non-personal authentication money processing area 12. This detection is performed by comparison of the non-authentication balance and the authentication balance as in the case of the system of FIGS. 1-7. The structure of this second embodiment also executes a disbursement process to the non-personal authentication money processing area 12 from the personal authentication money processing area 13.

The electronic cashing card settlement system of this embodiment, based on the structure explained above, will be described with reference to the operation flowchart of FIG. 8. First, like the system of FIGS. 1-6, steps SP 1-SP 44 are executed. When the non-authentication balance is determined to be smaller than or equal to the authentication balance in step SP 44, this non-authentication balance is further compared with the amount of sales input in step SP 2 (step SP 51).

When the non-authentication balance is found to be smaller than the amount of sales in step SP 51, an amount from the personal authentication money processing is disbursed to the non-personal authentication money processing side, but only in a preset amount (step SP 52). This disbursement process can have its limit amount for disbursement set to an amount of money predetermined depending on the owner of IC card 10 or the application area (class of shopping stores) of IC card 10; or to a predetermined amount or an amount of a predetermined rate for each deposit and disbursement by the personal authentication money processing; or to an amount limiting the non-authentication balance to a predetermined amount or less.

When the predetermined amount of money is deposited by the disbursement process to the non-personal authentication money processing area, the non-authentication balance is updated by the new non-authentication balance. The new non-authentication balance is obtained by adding the predetermined deposited amount to the non-authentication balance that was read in step SP 42 (step SP 53). Moreover, this predetermined deposited amount is written to the disbursement content history area 12*a* as new data added to the amount of money data (step SP 54). When the amount of money is written and the non-authentication balance is updated in the disbursement content history area 12*a*, the operations of steps SP 51-SP 54 are repeated, beginning at step SP 51, for the updated new non-authentication balance.

When the non-authentication balance is found at step SP 51 to be larger than the amount of sales, steps SP 46-SP 50 and step SP 55, illustrated in FIG. 5, are executed in the same manner as in the first embodiment.

In the embodiment explained above, determinations for comparison and matching between the non-authentication balance and the authentication balance, determinations for whether the upper limit value of continuous processes or the upper limit value of continuous amount, and arithmetic operations of various kinds may be executed. These determinations and operations may be executed by the controlled arithmetic means 4, write controlling means 3, synchronous processing means 5 and comparison arithmetic means 6 of the IC card 10. Alternatively, such determinations and operations my be executed by a terminal unit having a R/W unit, an ATM, or a POS device installed on the shopping store side. Moreover, such determinations and operations may also be executed by shared processes between each of the arithmetic means explained above.

In the present invention, a settlement process is executed by a personal authentication money processing to execute settlement of money under the condition of matching a personal authentication. A personal authentication balance of the personal authentication money processing memory is updated and a non-authentication balance of the non-personal authentication money processing memory is updated to an amount equal to or smaller than the authentication balance.

It may happen that the non-personal authentication balance is found to be larger than the authentication balance. This may occur as a result of comparison on the occasion of executing a settlement process by a non-personal authentication money processing which executes settlement of money without a condition for matching the personal authentication. In this situation it is determined that an illegal process has been performed with the electronic cashing card.

These features allow an amount of money from the personal authentication money processing to be deposited for use by a settlement process with the non-personal authentication money processing. Also, transaction security can be assured, providing the advantages of greatly improved convenience and safety in use of the IC card.

As this invention may be embodied in several forms without departing from the spirit or essential characteristics thereof, the present embodiments are therefore illustrative and not restrictive. It will be appreciated by those skilled in the art that changes may be made to these embodiments without departing from the principles and spirit of the invention. Accordingly, the scope of the invention is defined by the appended claims rather than by the description preceding them, and all changes that fall within the metes and bounds of the claims, or equivalents of such metes and bounds thereof, are therefore intended to be embraced by the claims.

What is claimed is:

1. A system for transaction settlement with an electronic cashing card having a non-authentication money processing memory and an authentication money processing memory, said system comprising:

means for updating an authentication money balance stored in a money balance area of the authentication money processing memory on the card and for updating a non-authentication money balance stored in a money balance area of the non-authentication money processing memory on the card, said means updating the authentication money balance to a money balance amount after settlement when a transaction is settled by an authentication process having a requirement for a personal authentication to be matched, said means updating the non-authentication money balance to an amount less than or equal to the stored authentication money balance when the transaction is settled by the authentication process; and means for comparing the non-authentication money and the authentication money balances on the card and determining that an illegal process has been performed with the card when the non-authentication money balance is larger than the authentication money balance.

2. The system recited in claim 1, wherein:

when a transaction is settled by a non-authentication process wherein the personal authentication is not required to be matched, the money balance amount after the settlement is calculated based on the stored authentication money balance and the non-authentication money balance is updated to the calculated money balance amount after the settlement; and when a transaction is settled by the authentication process, the money balance amount after the settlement is calculated based on the stored non-authentication money balance and both the authentication money balance and the non-authentication money balance are updated to the calculated money balance amount after the settlement.

3. The system recited in claim 1, wherein:

when the transaction is settled by a non-authentication process wherein the personal authentication is not required to be matched, the money balance amount after the settlement is calculated based on the stored non-authentication money balance and the non-authentication money balance is updated to the calculated money balance amount after the settlement; and when a transaction is settled by the authentication process, the money balance amount after the settlement is calculated based on the stored authentication money balance and the stored non-authentication money balance, and the authentication money balance is updated to the calculated money balance amount after the settlement, and the non-authentication money balance is updated according to a preset condition amount.

4. The system recited in claim 1, wherein the authentication money balance and the non-authentication money balance are compared in each of successive transactions to be settled by a non-authentication process wherein the personal authentication is not required to be matched, when a count of the successive transactions completed is less than or equal to a predetermined number.

5. The system recited in claim 1, wherein:

a settlement amount limit is set for settlement of transactions by a non-authentication process wherein the personal authentication is not required to be matched; and said comparing and determining means determines that an illegal process has been performed with the card when a disbursement amount, to be written in the non-authentication money processing memory as a disbursement history, exceeds the settlement amount limit.

6. The system recited in claim 1, wherein when the authentication process is invoked to perform a deposit or to settle a transaction, a money amount is deposited for the authentication process and is written to a predetermined area of the non-authentication money processing memory, the money amount comprising at least one of a predetermined cash amount and a predetermined rate amount.

7. The system recited in claim 1, further comprising within the card:

arithmetic means for executing arithmetic calculations for the authentication process and a non-authentication process wherein the personal authentication is not required to be matched, said arithmetic means further controlling data reading and writing operations from and to the non-authentication money processing memory and the authentication money processing memory; and input/output means for executing data input/output operations between the arithmetic means and an external unit.

8. The system recited in claim 1, wherein the card comprises an integrated circuit.

9. The system recited in claim 1, wherein the card is a prepaid card.

10. A method of transaction settlement with an electronic cashing card having a non-authentication money processing memory and an authentication money processing memory, the method comprising:

updating an authentication money balance stored in the authentication money processing memory on the card and a non-authentication money balance stored in the non-authentication money processing memory on the card, the authentication money balance being updated to a balance amount after settlement when a transaction is settled by an authentication process having a requirement for a personal authentication to be matched, the non-authentication money balance being updated to an amount less than or equal to the stored authentication money balance when the transaction is settled by the authentication process; and determining that an illegal process has been performed with the card when a comparison of the non-authentication money and the authentication money balances on the card indicates that the non-authentication money balance is larger than the authentication money balance.

11. The method recited in claim 10, wherein:

when a transaction is settled by a non-authentication process wherein the personal authentication is not required to be matched, the money balance amount after the settlement is calculated based on the stored authentication money balance and the non-authentication money balance is updated to the calculated money balance amount after the settlement; and when a transaction is settled by the authentication process, the money balance amount after the settlement is calculated based on the stored non-authentication money balance and both the authentication money balance and the non-authentication money balance are updated to the calculated money balance amount after the settlement.

12. The method recited in claim 10, wherein:

when the transaction is settled by a non-authentication process wherein the personal authentication is not required to be matched, the money balance amount after the settlement is calculated based on the stored non-authentication money balance and the non-authentication money balance is updated to the calculated money balance amount after the settlement; and when a transaction is settled by the authentication process, the money balance amount after the settlement is calculated based on the stored authentication money balance and the stored non-authentication money balance, and the authentication money balance is updated to the calculated money balance amount after the settlement, and the authentication money balance is updated to a preset condition amount.

13. The method recited in claim 10, wherein the authentication money balance and the non-authentication money balance are compared in each of successive transactions to be settled by a non-authentication process wherein the personal authentication is not required to be matched, when a count of the successive transactions completed is less than or equal to a predetermined number.

14. The method recited in claim 10, further comprising determining that an illegal process has been performed with the card when a settlement amount limit is less than a disbursement amount to be written in the non-authentication money processing memory as a disbursement history, the settlement amount limit being set for settlement of transactions by a non-authentication process wherein the personal authentication is not required to be matched.

15. The method recited in claim 10, wherein when the authentication process is invoked to perform a deposit or to settle a transaction, a money amount is deposited for the authentication process and is written to a predetermined area of the non-authentication money processing memory, the money amount comprising at least one of a predetermined cash amount and a predetermined rate amount.

16. The method recited in claim 10, further comprising:

executing within the card arithmetic calculations for the authentication process and a non-authentication process wherein the personal authentication is not required to be matched;

controlling within the card data reading and writing operations from and to the non-authentication money processing memory and the authentication money processing memory; and executing within the card data input/output operations between the card and an external unit.

17. A computer readable medium encoded with a program for settlement of transactions with an electronic cashing card having a non-authentication money processing memory and an authentication money processing memory, said program controlling the electronic cashing card to perform operations comprising:

updating an authentication money balance stored in the authentication money processing memory and a non-authentication money balance stored in the non-authentication money processing memory, the authentication money balance being updated to a money balance amount after settlement when a transaction is settled by an authentication process having a requirement for a personal authentication to be matched, the non-authentication money balance being updated to an amount less than or equal to the stored authentication money balance when the transaction is settled by the authentication process; and determining that an illegal process has been performed with the card when a comparison of the non-authentication money and the authentication money balances on the card indicates that the non-authentication money balance is larger than the authentication money balance.

18. The computer readable medium recited in claim 17, wherein:

when a transaction is settled by a non-authentication process wherein the personal authentication is not required to be matched, the money balance amount after the settlement is calculated based on the stored authentication money balance and the non-authentication money balance is updated to the calculated money balance amount after the settlement; and when a transaction is settled by the authentication process, the money balance amount after the settlement is calculated based on the stored non-authentication money balance and both the authentication money balance and the non-authentication money balance are updated to the calculated money balance amount after the settlement.

19. The computer readable medium recited in claim 17, wherein:

when the transaction is settled by a non-authentication process wherein the personal authentication is not required to be matched, the money balance amount after the settlement is calculated based on the stored non-authentication money balance and the non-authentication money balance is updated to the calculated money balance amount after the settlement; and when a transaction is settled by the authentication process, the money balance amount after the settlement is calculated based on the stored authentication money balance and the stored non-authentication money balance, and the authentication money balance is updated to the calculated money balance amount after the settlement, and the authentication money balance is updated to a preset condition amount.

20. The computer readable medium recited in claim 17, wherein the authentication money balance and the non-authentication money balance are compared in each of successive transactions to be settled by a non-authentication process wherein the personal authentication is not required to be matched, when a count of the successive transactions is less than or equal to a predetermined number.

21. The computer readable medium recited in claim 17, wherein said program further comprises a procedure for determining that an illegal process has been performed with the card when a settlement amount limit is less than a disbursement amount to be written in the non-authentication money processing memory as a disbursement history, the settlement amount limit being set for settlement of transactions by a non-authentication process wherein the personal authentication is not required to be matched.

22. The computer readable medium recited in claim 17, wherein said operations further comprise depositing a money amount for the authentication process and writing the money amount to a predetermined area of the non-authentication money processing memory when the authentication process is invoked to perform a deposit or to settle a transaction, the money amount comprising at least one of a predetermined cash amount and a predetermined rate amount.

23. The computer readable medium recited in claim 17, wherein said operations further comprise:
    executing within the card arithmetic calculations for the authentication process and a non-authentication process wherein the personal authentication is not required to be matched;
    controlling within the card data reading and writing operations from and to the non-authentication money processing memory and the authentication money processing memory; and
    executing within the card data input/output operations between the card and an external unit.

24. A method, comprising:
    updating a non-authentication money balance that is stored on a card to an amount less than or equal to an authentication money balance that is stored on the card, after an authenticated transaction settlement with the card; and
    determining that an illegal process has been performed with the card when the non-authentication money balance is larger than the authentication money balance.

* * * * *